United States Patent
Markle et al.

(10) Patent No.: US 6,650,423 B1
(45) Date of Patent: Nov. 18, 2003

(54) METHOD AND APPARATUS FOR DETERMINING COLUMN DIMENSIONS USING SCATTEROMETRY

(75) Inventors: Richard J. Markle, Austin, TX (US); Kevin R. Lensing, Austin, TX (US); J. Broc Stirton, Austin, TX (US); Marilyn I. Wright, Austin, TX (US)

(73) Assignee: Advanced Micro Devices Inc., Austin, TX (US)

( * ) Notice: Subject to any disclaimer, the term of this patent is extended or adjusted under 35 U.S.C. 154(b) by 50 days.

(21) Appl. No.: 09/897,623

(22) Filed: Jul. 2, 2001

(51) Int. Cl.$^7$ .............................................. G01B 11/00
(52) U.S. Cl. .................... 356/601; 356/237.5; 356/394; 438/7; 438/14
(58) Field of Search .................... 356/601, 237.1, 356/237.6, 388, 392, 394, 625, 636; 438/6–8, 12, 14–16, 18, 401, 402; 250/306; 324/719, 765

(56) References Cited

U.S. PATENT DOCUMENTS

| | | | |
|---|---|---|---|
| 5,393,624 A | | 2/1995 | Ushijima ..................... 430/30 |
| 5,736,863 A | * | 4/1998 | Liu ............................ 324/765 |
| 5,867,276 A | | 2/1999 | McNeil et al. ............... 356/445 |
| 5,880,838 A | | 3/1999 | Marx et al. .................. 356/351 |
| 5,920,067 A | * | 7/1999 | Cresswell et al. .......... 250/306 |
| 6,051,348 A | | 4/2000 | Marinaro et al. ............. 430/30 |
| 6,245,584 B1 | | 6/2001 | Marinaro et al. ............. 438/14 |
| 6,259,521 B1 | * | 7/2001 | Miller et al. ............. 356/237.5 |
| 6,316,276 B1 | * | 11/2001 | Gregory et al. ................. 438/8 |
| 6,327,035 B1 | * | 12/2001 | Li et al. ...................... 356/630 |
| 6,391,699 B1 | * | 5/2002 | Madson et al. ............. 438/212 |
| 6,436,247 B1 | * | 8/2002 | Sandhu ........................ 234/719 |
| 6,464,563 B1 | * | 10/2002 | Lensing .......................... 451/6 |
| 6,486,036 B1 | * | 11/2002 | Miethke et al. ............. 437/401 |
| 6,489,005 B1 | * | 12/2002 | Armacost et al. ........... 428/119 |

OTHER PUBLICATIONS

Bishop et al., "Use of Scatterometry for resist process control," *SPIE Integrated Circuit Metrology, Inspection and Process Control*, 1673:441–452, 1992.

Hickman et al., "Use of diffracted light from latent images to improve lithography control," *SPIE Integrated Circuit Metrology, Inspection and Process Control*, 1464:245–257, 1991.

McNeil et al., "Scatterometry applied to microelectronics processing—Part 1," *Solid State Technology*, 37(3):29–56, 1993.

(List continued on next page.)

*Primary Examiner*—Frank G. Font
*Assistant Examiner*—Sang H. Nguyen
(74) *Attorney, Agent, or Firm*—Williams, Morgan & Amerson, P.C.

(57) ABSTRACT

A test structure includes a plurality of trenches and a plurality of columns defined in the trenches. A method for determining column dimensions includes providing a wafer having a test structure comprising a plurality of trenches and a plurality of columns defined in the trenches; illuminating at least a portion of the columns with a light source; measuring light reflected from the illuminated portion of the columns to generate a reflection profile; and determining a dimension of the columns based on the reflection profile. A metrology tool adapted to receive a wafer having a test structure comprising a plurality of trenches and a plurality of columns defined in the trenches includes a light source, a detector, and a data processing unit. The light source is adapted to illuminate at least a portion of the columns. The detector is adapted to measure light reflected from the illuminated portion of the columns to generate a reflection profile. The data processing unit is adapted to determine a dimension of the columns based on the reflection profile.

59 Claims, 5 Drawing Sheets

OTHER PUBLICATIONS

Miller and Mellicamp, "Development of an end–point detection procedure for the post–exposure bake process," *Integrated circuit metrology, inspection, and process control IX: Feb. 20–22, 1995, Santa Clara, California, SPIE Integrated Circuit Metrology, Inspection and Process Control*, 2439:78–88, 1995.

Milner et al., "Latent image exposure monitor using scatterometry," *SPIE Integrated Circuit Metrology, Inspection and Process Control*, 1673:274–283, 1992.

Prins et al., "Scatterometric sensor for PEB process control," *Metrology, inspection, and process control for microlithogtaphy*, X:Mar. 11–13, 1996, *Santa Clara, California, SPIE Integrated Circuit Metrology, Inspection and Process Control*, 2725:710–719, 1996.

Raymond et al., "Multiparameter process metrology using scatterometry," In: *Optical characterization techniques for high–performance microelectronic device manufacturing II, SPIE—The International Society for Optical Engineering*, 2638:84–93, Austin, Texas, Oct. 25–26, 1995.

Raymond et al., "Scatterometric sensor for lithography," In: *Manufacturing process control for microelectronic devices and circuits, SPIE—The International Society for Optical Engineering*, 2336:37–49, Austin, Texas, Oct. 20–21, 1994.

Sturtevant et al., "Post–exposure bake as a process–control parameter for chemically–amplified photoresist," *Metrology, inspection, and process control for microlithogtaphy, VII: Mar. 2–4, 1993, Santa Jose, California, SPIE Integrated Circuit Metrology, Inspection and Process Control*, vol. 1926, 1993.

Sturtevant et al., "Use of scatterometric latent image detector in closed loop feedback control of linewidth," *SPIE Integrated Circuit Metrology, Inspection and Process Control*, 2196:352–359, 1994.

* cited by examiner

METHOD AND APPARATUS FOR DETERMINING COLUMN DIMENSIONS USING SCATTEROMETRY

BACKGROUND OF THE INVENTION

1. Field of the Invention

This invention relates generally to the field of semiconductor device manufacturing and, more particularly, to a method and apparatus for determining column dimensions using scatterometry.

2. Description of the Related Art

There is a constant drive within the semiconductor industry to increase the quality, reliability and throughput of integrated circuit devices, e.g., microprocessors, memory devices, and the like. This drive is fueled by consumer demands for higher quality computers and electronic devices that operate more reliably. These demands have resulted in a continual improvement in the manufacture of semiconductor devices, e.g., transistors, as well as in the manufacture of integrated circuit devices incorporating such transistors. Additionally, reducing the defects in the manufacture of the components of a typical transistor also lowers the overall cost per transistor as well as the cost of integrated circuit devices incorporating such transistors.

The technologies underlying semiconductor processing tools have attracted increased attention over the last several years, resulting in substantial refinements. However, despite the advances made in this area, many of the processing tools that are currently commercially available suffer certain deficiencies. In particular, such tools often lack advanced process data monitoring capabilities, such as the ability to provide historical parametric data in a user-friendly format, as well as event logging, real-time graphical display of both current processing parameters and the processing parameters of the entire run, and remote, i.e., local site and worldwide, monitoring. These deficiencies can engender nonoptimal control of critical processing parameters, such as throughput, accuracy, stability and repeatability, processing temperatures, mechanical tool parameters, and the like. This variability manifests itself as within-run disparities, run-to-run disparities and tool-to-tool disparities that can propagate into deviations in product quality and performance, whereas an ideal monitoring and diagnostics system for such tools would provide a means of monitoring this variability, as well as providing means for optimizing control of critical parameters.

Semiconductor devices are manufactured from wafers of a substrate material. Layers of materials are added, removed, and/or treated during fabrication to create the electrical circuits that make up the device. The fabrication essentially comprises four basic operations. Although there are only four basic operations, they can be combined in hundreds of different ways, depending upon the particular fabrication process.

The four operations typically used in the manufacture of semiconductor devices are:

layering, or adding thin layers of various materials to a wafer from which a semiconductor device is produced;

patterning, or removing selected portions of added layers;

doping, or placing specific amounts of dopants in the wafer surface through openings in the added layers; and heat treatment, or heating and cooling the materials to produce desired effects in the processed wafer.

Among the important aspects in semiconductor device manufacturing are rapid thermal annealing (RTA) control, chemical-mechanical polishing (CMP) control, etch control, and photolithography control. As technology advances facilitate smaller critical dimensions for semiconductor devices, the need for reduction of errors increases dramatically. Proper formation of sub-sections within a semiconductor device is an important factor in ensuring proper performance of the manufactured semiconductor device. Critical dimensions of the sub-sections generally have to be within a predetermined acceptable margin of error for semiconductor devices to be within acceptable manufacturing quality.

Generally, most features on a semiconductor device are formed by depositing layers of material (e.g., conductive or insulative) and patterning the process layers using photolithography and etch processes. The various process layers used for forming the features have many specialized functions. Certain layers are used to form conductive features, others are used to form insulating features, and still others are intermediate layers used to enhance the functionality of the processing steps used to pattern and form the functional layers.

There are many variables that affect the accuracy and repeatability of the photolithography and etch processes used to form features from the process layers. Typical metrology data collection for measuring the efficacy of the photolithography and etch processes do not provide data that is sufficiently accurate and timely to facilitate run-to-run control of such processes. Certain techniques, such as scanning electron microscope (SEM) analysis, may be used to generate two-dimensional data, such as a critical width dimension, but they cannot be used to characterize the entire feature. For example, to generate a sidewall angle measurement, an important measure of quality, a destructive cross-section SEM analysis is required. Destructive tests are expensive, as they require destruction of the wafer, and thus, it is impractical to perform such tests at a frequency that would allow run-to-run control.

The present invention is directed to overcoming, or at least reducing the effects of, one or more of the problems set forth above.

SUMMARY OF THE INVENTION

One aspect of the present invention is seen in a test structure including a plurality of trenches and a plurality of columns defined in the trenches.

Another aspect of the present invention is seen in a method for determining column dimensions. The method includes providing a wafer having a test structure comprising a plurality of trenches and a plurality of columns defined in the trenches; illuminating at least a portion of the columns with a light source; measuring light reflected from the illuminated portion of the columns to generate a reflection profile; and determining a dimension of the columns based on the reflection profile.

Yet another aspect of the invention is seen in a metrology tool. The metrology tool is adapted to receive a wafer having a test structure comprising a plurality of trenches and a plurality of columns defined in the trenches. The metrology tool includes a light source, a detector, and a data processing unit. The light source is adapted to illuminate at least a portion of the columns. The detector is adapted to measure light reflected from the illuminated portion of the columns to generate a reflection profile. The data processing unit is adapted to determine a dimension of the columns based on the reflection profile.

BRIEF DESCRIPTION OF THE DRAWINGS

The invention may be understood by reference to the following description taken in conjunction with the accompanying drawings, in which like reference numerals identify like elements, and in which.

Figure 1:
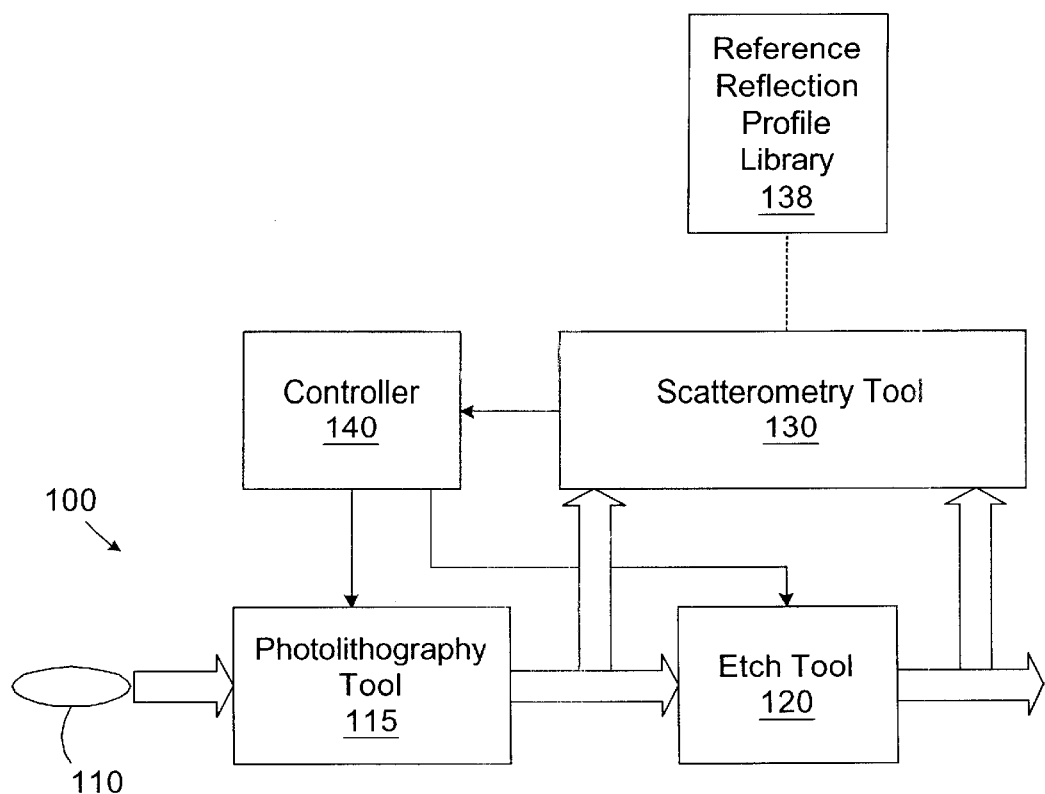
FIG. 1 is a simplified diagram of an illustrative processing line for processing wafers in accordance with one illustrative embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Referring to FIG. 1, a simplified diagram of an illustrative processing line 100 for processing wafers 110 in accordance with one illustrative embodiment of the present invention is provided. The processing line 100 includes a photolithography tool 115 for forming a pattern in a photoresist layer formed on the wafer 110 and an etch tool 120 for etching features of various process layers formed on the wafer 110 using the pattern defined by the photolithography tool 115. The processing line 100 includes a scatterometry tool 130 adapted to measure dimensions of the features formed in either the photoresist layer or the etched process layer using a test structure 200 (shown in FIG. 2) formed on the wafer 110.

In general, the scatterometry tool 130 includes optical hardware, such as an ellipsometer or reflectometer, and a data processing unit loaded with a scatterometry software application for processing data collected by the optical hardware. For example, the optical hardware may include a model OP5140 or OP5240 with a spectroscopic ellipsometer offered by Therma-Wave, Inc. of Freemont Calif. The data processing unit may comprise a profile application server manufactured by Timbre Technologies, a subsidiary of Tokyo Electron Limited, Inc. of Tokyo, Japan and distributed by Therma-Wave, Inc. The scatterometry tool 130 may be external or, alternatively, the scatterometry tool 130 may be installed in an in-situ arrangement.

A controller 140 is provided for providing feedback to the photolithography tool 115 and/or the etch tool 120 based on the measurements generated by the scatterometry tool 130. The controller 140 adjusts the operating recipe of the controlled tool 115, 120 to improve the photolithography or etching process for subsequently processed wafers 110. The controller 140 may also use the measurements generated by the scatterometry tool 130 for fault detection. If the scatterometry tool 130 measures variation sufficient to significantly degrade the performance of the devices, the wafer may be scrapped or reworked prior to performing any additional process steps.

In the illustrated embodiment, the controller 140 is a computer programmed with software to implement the functions described. However, as will be appreciated by those of ordinary skill in the art, a hardware controller designed to implement the particular functions may also be used. Moreover, the functions performed by the controller 140, as described herein, may be performed by multiple controller devices distributed throughout a system. Additionally, the controller 140 may be a stand-alone controller, it may be integrated into a tool, such as the photolithography tool 115, etch tool 120, or the scatterometry tool 130, or it may be part of a system controlling operations in an integrated circuit manufacturing facility.

Portions of the invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

An exemplary software system capable of being adapted to perform the functions of the controller 140, as described, is the Catalyst system offered by KLA-Tencor, Inc. The Catalyst system uses Semiconductor Equipment and Materials International (SEMI) Computer Integrated Manufacturing (CIM) Framework compliant system technologies and is based on the Advanced Process Control (APC) Framework. CIM (SEMI E81-0699—Provisional Specification for CIM Framework Domain Architecture) and APC (SEMI E93-0999—Provisional Specification for CIM Framework Advanced Process Control Component) specifications are publicly available from SEMI.

Figure 2:
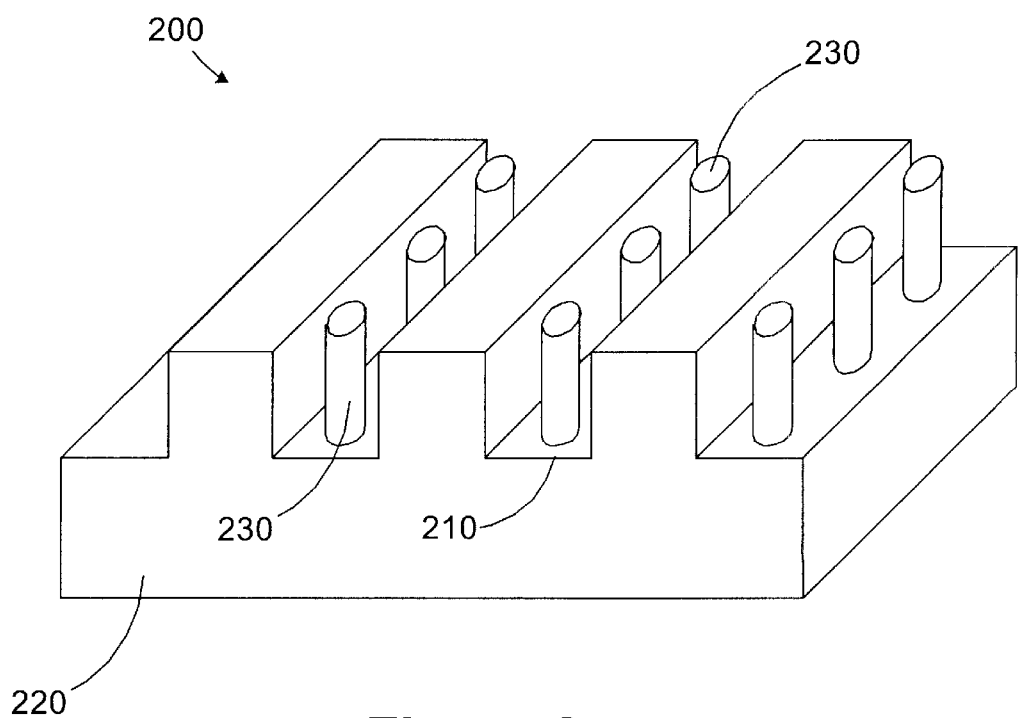
FIG. 2 is a cross section view of an exemplary test structure that may be used in the processing line of FIG. 1.

The test structure 200 of FIG. 2 provides a repeating grating pattern suitable for measuring using scatterometry. The test structure 200 may be formed in a region of the wafer 110 not normally used for forming devices (e.g., in the periphery region where identification codes are typically scribed or in the scribe lines between production die).

As shown in FIG. 2, the test structure 200 includes a plurality of trenches 210 defined in a base layer 220. Columns 230 are formed in the trenches 210 in a repeating pattern. The columns 230 may be formed during the same process (i.e., photolithography or etch) that is used to form features in the production devices on the wafer 110. In the illustrated embodiment, the columns 230 have a round cross-section, although other cross-section shapes (e.g., rectangular) may also be used. The arrangement of columns 230 shown in FIG. 2 is a row and column arrangement. In other variations, the columns 230 may be staggered, i.e., the columns 230 in one trench 210 are offset from the columns 230 in an adjacent trench 210. The particular material used to form the base layer 220 may vary depending on the particular process being monitored. For example, the base layer 220 may be a photoresist layer used as a mask pattern for etching, a conductive layer, such as polysilicon or aluminum, an insulative layer, such as silicon dioxide, or a substrate layer, such as epitaxial silicon.

Figure 3:
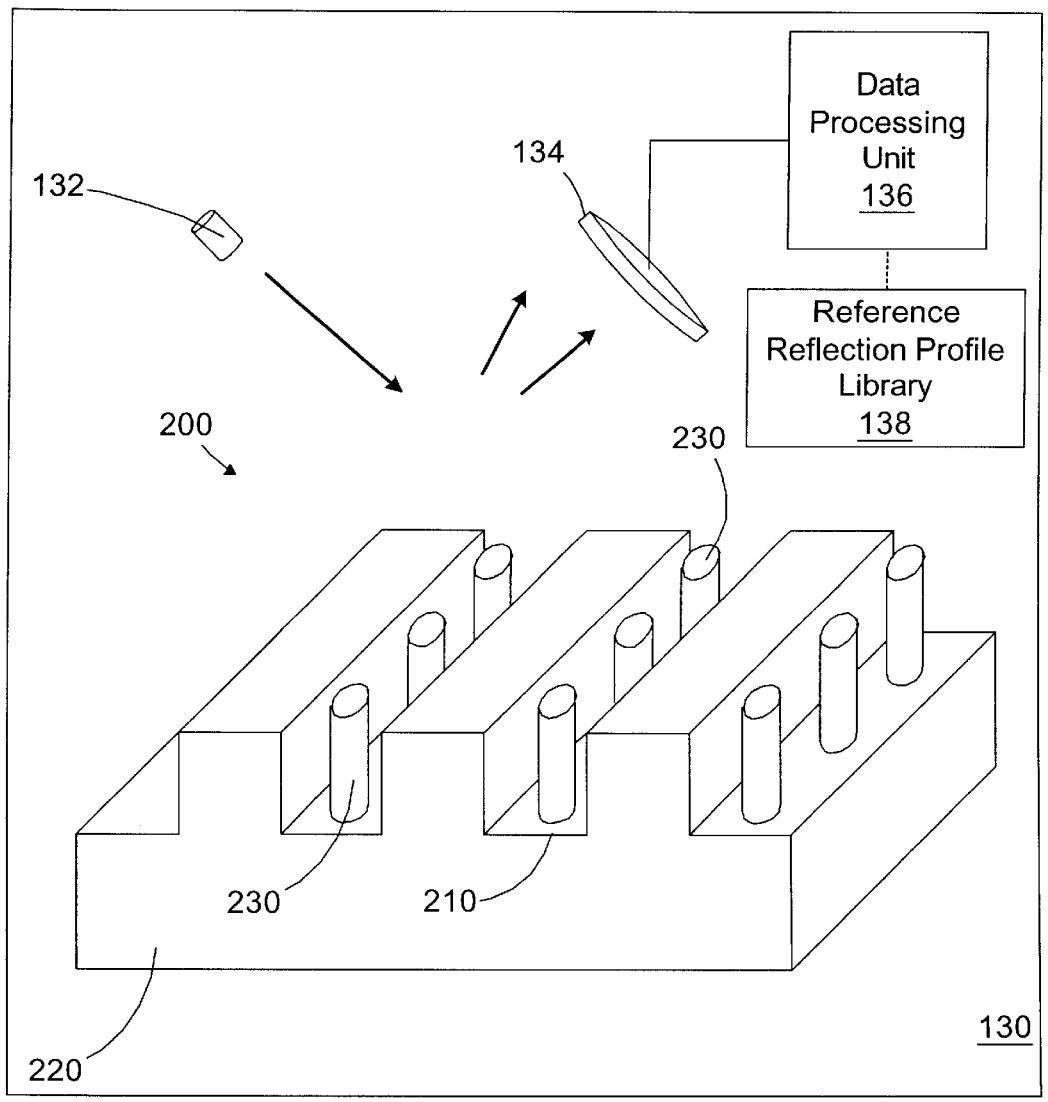
FIG. 3 is a simplified view of the scatterometry tool of FIG. 1.

Turning now to FIG. 3, a simplified view of the scatterometry tool 130 loaded with a wafer 110 having the test structure 200 of FIG. 2 is provided. The scatterometry tool 130, includes a light source 132 and a detector 134 positioned proximate the test structure 200. The light source 132 of the scatterometry tool 130 illuminates at least a portion of the test 20 structure 200, and the detector 134 takes optical measurements, such as intensity or phase, of the reflected light. A data processing unit 136 receives the optical measurements from the detector 134 and processes the data to identify dimensions of the columns 230.

The scatterometry tool 130 may use monochromatic light, white light, or some other wavelength or combinations of wavelengths, depending on the specific implementation. The angle of incidence of the light may also vary, depending on the specific implementation. The light analyzed by the scatterometry tool 130 typically includes a reflected component (i.e., incident angle equals reflected angle) and a refracted component (i.e., incident angle does not equal the reflected angle). For purposes of discussion here, the term "reflected" light is meant to encompass both components.

Dimensional variations, such as diameter, cross-sectional shape, and sidewall angle, in the columns 230 cause changes in the reflection profile (e.g., intensity vs. wavelength—tan ($\delta$), phase vs. wavelength—cos($\psi$), where $\delta$ and $\psi$ are common scatterometry outputs known to those of ordinary skill in the art) measured by the scatterometry tool 130 as compared to the light scattering profile that would be present in columns 230 having dimensions corresponding to design values, or at least acceptable values.

Figure 4A:
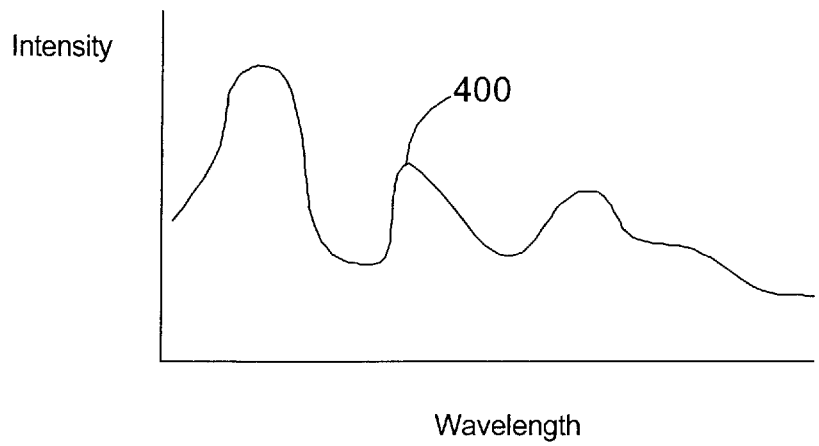
FIGS. 4A, 4B, and 4C illustrate a library of exemplary scatterometry curves used to characterize the wafer measured in the scatterometry tool of FIG. 3.
Figure 4B:
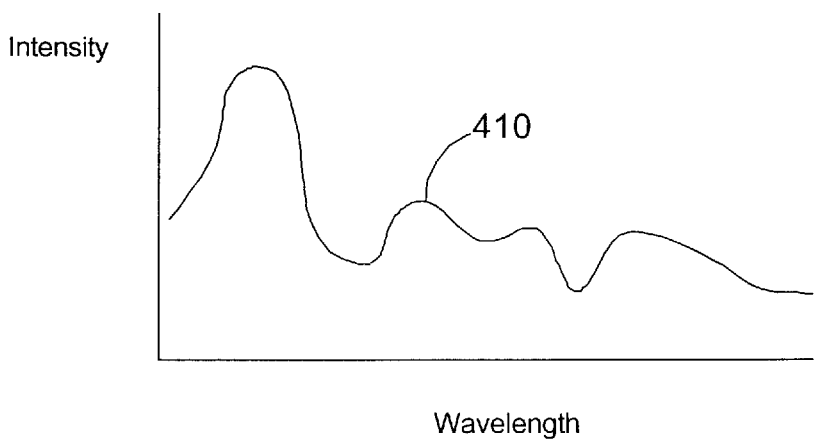
Figure 4C:
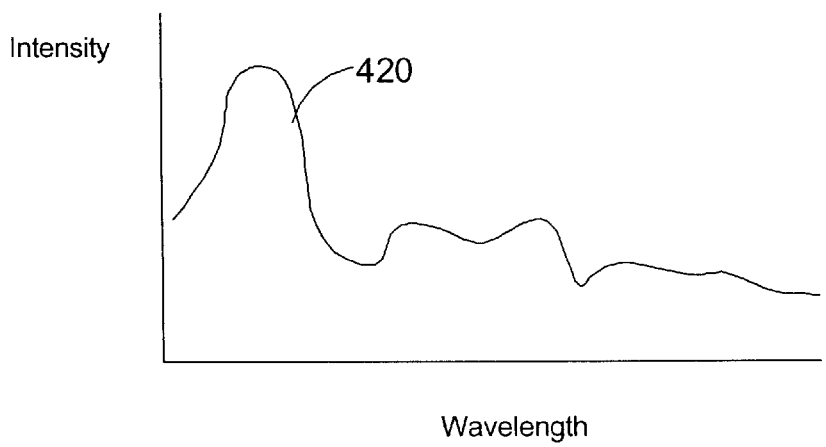

FIGS. 4A, 4B, and 4C illustrate exemplary reflection profiles 400, 410, 420 that may be included in a reference reflection profile library 138 (see FIG. 1) used by the data processing unit 136 to characterize the column dimensions based on the reflection profiles measured by the scatterometry tool 130. The particular reflection profile expected for any structure depends on the specific geometry of the test structure 200 and the parameters of the measurement technique employed by the scatterometry tool 130 (e.g., light bandwidth, angle of incidence, etc.). The profiles in the reference reflection profile library 138 are typically calculated theoretically by employing Maxwell's equations to model individual spectra based on the expected characteristics of the test structure 200. Spectra are generated at a pre-determined resolution for many, if not all, profiles that may be expected, and the sum of all said spectra constitute the reference reflection profile library 138. Scatterometry libraries are commercially available from Timbre Technologies, Inc. The profiles in the reference reflection profile library 138 may also be generated empirically by measuring reflection profiles of sample wafers and subsequently characterizing the measured wafers by destructive or non-destructive examination techniques.

The reflection profile 400 of FIG. 4A represents an exemplary profile for a test structure 200 having columns 230 with dimensions corresponding to design or target values. The reflection profile 410 of FIG. 4B represents an exemplary profile for a test structure 200 having columns 230 that exhibit a diameter slightly larger than a desired target value. The reflection profile 420 of FIG. 4C represents an exemplary profile for a test structure 200 having columns 230 that exhibit a further increased diameter. The reflection profiles of test structures 200 having columns 230 with different amounts of variation may be included in the reference reflection profile library 138. Similarly, reflection profiles may be included that correspond to variations in the height of the columns 230 and the sidewall angle of the columns 230.

The data processing unit 136 receives a reflection profile measured by the detector 134 and compares it to the reference reflection profile library 138. Each reference profile has an associated column dimension metric related to the dimensions of the columns 230. For example, the column dimension metric may comprise actual diameter, height, and/or sidewall angle measurements. The data processing unit 136 determines the reference reflection profile having the closest match to the measured reflection profile. Techniques for matching the measured reflection profile to the closest reference reflection profile are well known to those of ordinary skill in the art, so they are not described in greater detail herein. For example, a least squares error technique may be employed.

In another embodiment, the controller 140 or other external controller (not shown) may be adapted to compare the measured reflection profile to the reference reflection profile library 138. In such a case, the scatterometry tool 130 would output the matching reference reflection profile, and the controller 140 may link that reference reflection profile to an associated column dimension metric.

In still another embodiment, the measured reflection profile may be compared to a target reflection profile selected from the reference reflection profile library 138 for a test structure 200 having columns 230 exhibiting known and desired dimensions (e.g., the reflection profile 400 of FIG. 4A). For example, a target reflection profile may be calculated for a test structure 200 having columns 230 with ideal, or at least acceptable, dimensions using Maxwell's equations, and that target reflection profile may be stored in the reference reflection profile library 138. Thereafter, the measured reflection profile of a test structure 200 with columns having unknown dimensions is compared to the target reflection profile. Based upon this comparison, a relatively rough approximation of the dimensions may be determined. That is, by comparing the measured reflection profile to the target reflection profile, the dimensions of the columns 230 may be approximated, such that further matching of the measured reflection profile with additional reference reflection profiles from the reference reflection profile library 138 is unwarranted. Using this technique, an initial determination may be made as to the column dimensions. Of course, this step may be performed in addition to the matching or correlating of a measured reflection profile to a reference reflection profile from the reference reflection profile library 138 as described above. The column dimension approximation may also be used to generate a fault detection signal, where a significant deviation in dimensions may correspond to a failure in the etching process suggestive of a later failure or unacceptable performance of the devices in subsequent electrical testing due to the flawed etch process.

After receiving the column dimension metric from the scatterometry tool 130, the controller 140 may take a variety of autonomous actions. The actions may include fault detection and/or process control functions. In one embodiment of the present invention, the controller 140 is adapted to modify the operating recipe of the photolithography tool 115 or the etch tool 120 based on the column dimension metric to control operations on subsequently processed wafers. The controller 140 may adjust the recipes for subsequently processed wafers to control the dimensions of the columns 230. Photolithography recipe parameters, such as exposure time, exposure dose, depth of focus, resist spin speed, soft bake temperature, post exposure bake temperature, cool plate temperature, developer temperature, focus tilt, etc., or etch recipe parameters, such as the etch time, plasma chemical compositions, RF power, gas flow, chamber temperature, chamber pressure, end-point signal, etc., may be changed to correct sidewall angle deviations or height variations, for example.

Information gathered from the column dimensional analysis may be useful for judging the performance of photolithography or etch processes uses to form other features on the production devices, such as lines, trenches, contact openings, etc. For example, the etch profile may affect the sidewall angle of the columns and the sidewall angle of a trench or line formed in a production device in a similar fashion.

The controller 140 may use a control model of the photolithography tool 115 or the etch tool 120 for determining its operating recipe. For example, the controller 140 may use a control model relating the column dimension metric to a particular operating recipe parameter in the photolithography tool 115 or the etch tool 120 to control the process to correct for dimension variations. This correction may also result in the correction of the process as it affects the other features formed on the device. The control model may be developed empirically using commonly known linear or non-linear techniques. The control model may be a relatively simple equation based model (e.g., linear, exponential, weighted average, etc.) or a more complex model, such as a neural network model, principal component analysis (PCA) model, or a projection to latent structures (PLS) model. The specific implementation of the model may vary depending on the modeling technique selected.

Column dimension models may be generated by the controller 140, or alternatively, they may be generated by a different processing resource (not shown) and stored on the controller 140 after being developed. The column dimension models may be developed using the photolithography tool 115 or the etch tool 120 or using different tools (not shown) having similar operating characteristics. For purposes of illustration, it is assumed that the column dimension models are generated and updated by the controller 140 or other processing resource based on the actual performance of the photolithography tool 115 or the etch tool 120 as measured by the scatterometry tool 130. The column dimension models may be trained based on historical data collected from numerous processing runs of the photolithography tool 115 or the etch tool 120.

The controller 140 may also use the column dimension metric for fault detection. If the amount of column dimension variation measured is sufficient to indicate a potentially defective device, the wafer may be scrapped or reworked prior to performing any additional process steps.

Figure 5:
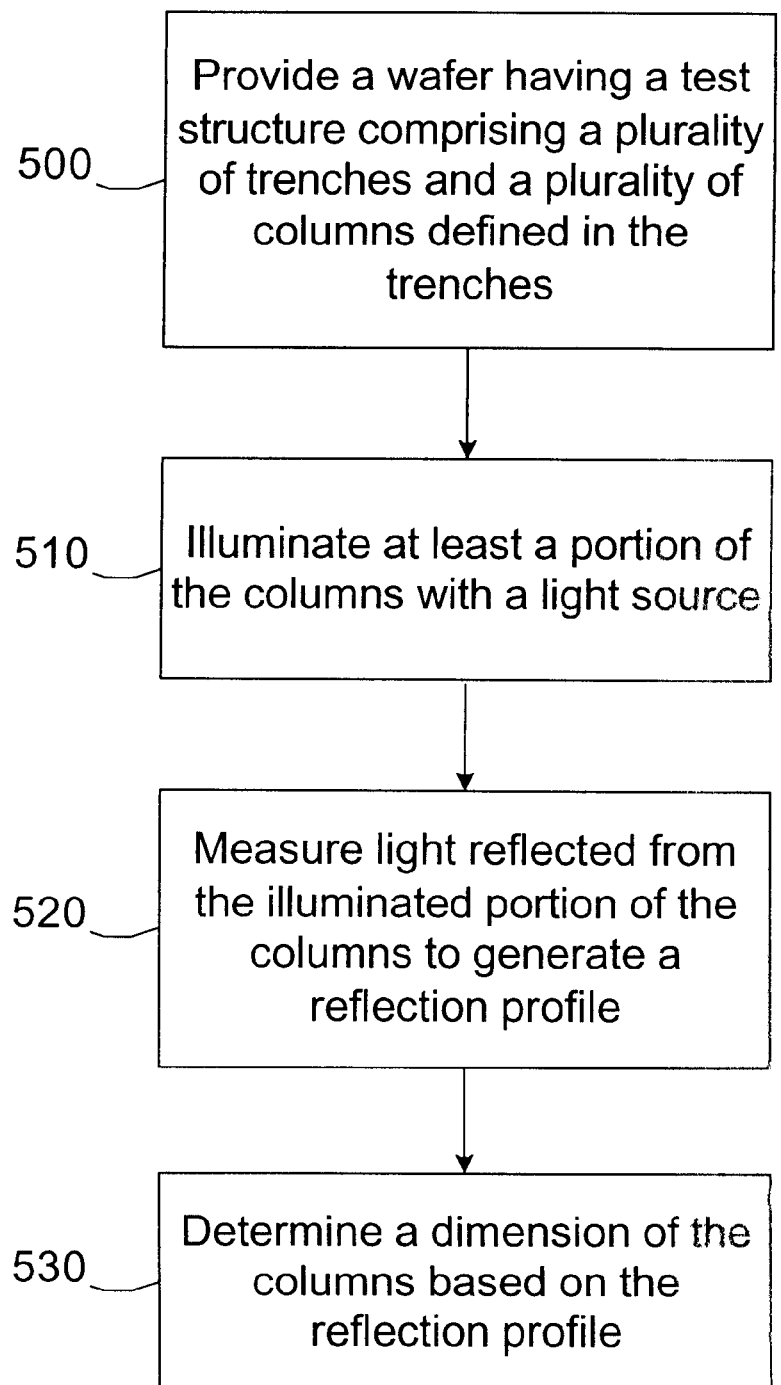
FIG. 5 is a simplified flow diagram of a method for determining column dimensions using scatterometry measurements in accordance with another illustrative embodiment of the present invention.

FIG. 5 is a simplified flow diagram of a method for determining column dimensions using scatterometry measurements in accordance with another illustrative embodiment of the present invention. In block 500, a wafer having a test structure 200 comprising a plurality of trenches 210 and a plurality of columns 230 defined in the trenches 210 is provided. In block 510, at least a portion of the columns 230 is illuminated with a light source. In block 520, light reflected from the illuminated portion of the columns 230 is measured to generate a reflection profile. In block 530, a dimension (e.g., diameter, height, sidewall angle) of the columns 230 is determined based on the reflection profile.

Monitoring column dimension variations based on measurements from the scatterometry tool 130, as described above, has numerous advantages. The photolithography tool 115 or the etch tool 120 may be controlled to reduce the amount of variation encountered. Decreased variation reduces the likelihood that a device may be degraded or must be scrapped. Accordingly, the quality of the devices produced on the processing line 100 and the efficiency of the processing line 100 are both increased.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method for determining column dimensions, comprising:
    providing a wafer having a test structure comprising a plurality of trenches each having a width dimension, and a plurality of columns defined in the trenches, each column having a width dimension less than the width dimension of the trench in which it is defined;
    illuminating at least a portion of the columns with a light source;
    measuring light reflected from the illuminated portion of the columns to generate a reflection profile; and
    determining a dimension of the columns based on the reflection profile.

2. The method of claim 1, wherein determining the dimension of the columns further comprises:
    comparing the generated reflection profile to a library of reference reflection profiles, each reference reflection profile having an associated column dimension metric;
    selecting a reference reflection profile closest to the generated reflection profile; and determining the dimension of the columns based on the column dimension metric associated with the selected reference reflection profile.

3. The method of claim 1, further comprising determining at least one parameter of an operating recipe of a etch tool adapted to etch a subsequent wafer based on the determined column dimension.

4. The method of claim 3, wherein determining at least one parameter of the operating recipe of the etch tool comprises determining at least one of an etch time parameter, a plasma chemical composition parameter, an RF power parameter, a gas flow parameter, a chamber temperature parameter, a chamber pressure parameter, and an endpoint signal parameter.

5. The method of claim 1, further comprising determining at least one parameter of an operating recipe of a photolithography tool adapted to process a subsequent wafer based on the determined column dimension.

6. The method of claim 5, wherein determining at least one parameter of the operating recipe of the photolithography tool comprises determining at least one of an exposure time parameter, an exposure dose parameter, a depth of focus parameter, a resist spin speed parameter, a soft bake temperature parameter, a post exposure bake temperature parameter, a cool plate temperature parameter, a developer temperature parameter, and a focus tilt parameter.

7. The method of claim 1, wherein generating the reflection profile comprises generating the reflection profile based on at least one of intensity and phase of the reflected light.

8. The method of claim 1, wherein determining the dimension of the columns further comprises:
    comparing the generated reflection profile to a target reflection profile; and
    determining the dimension of the columns based on the comparison of the generated reflection profile and the target reflection profile.

9. The method of claim 1, further comprising identifying a fault condition associated with the columns based on the determined column dimension.

10. The method of claim 1, wherein determining the dimension of the columns further comprises determining at least one of a diameter dimension, a height dimension, and a sidewall angle dimension.

11. The method of claim 1, wherein providing the wafer further comprises providing the wafer having the test structure comprising the plurality of trenches and the plurality of columns defined in the trenches, the columns in one trench being aligned with the columns in an adjacent trench.

12. The method of claim 1, wherein providing the wafer further comprises providing the wafer having the test structure comprising the plurality of trenches and the plurality of columns defined in the trenches, the columns in one trench being offset with respect to the columns in an adjacent trench.

13. A method for determining columns dimensions, comprising:
    providing a wafer having a test structure comprising a plurality of trenches each having a width dimension, and a plurality of columns defined in the trenches, each column having a width dimension less than the width dimension of the trench in which it is defined;
    illuminating at least a portion of the columns with a light source;
    measuring light reflected from the illuminated portion of the columns to generate a reflection profile;
    comparing the generated reflection profile to a library of reference reflection profiles each reference reflection profile having an associated column dimension metric;
    selecting a reference reflection profile closest to the generated reflection profile; and
    determining a dimension of the columns based on the column dimension metric associated with the selected reference reflection profile.

14. The method of claim 13, further comprising determining at least one parameter of an operating recipe of a etch tool adapted to etch a subsequent wafer based on the determined column dimension.

15. The method of claim 14, wherein determining at least one parameter of the operating recipe of the etch tool comprises determining at least one of an etch time parameter, a plasma chemical composition parameter, an RF power parameter, a gas flow parameter, a chamber temperature parameter, a chamber pressure parameter, and an endpoint signal parameter.

16. The method of claim 13, further comprising determining at least one parameter of an operating recipe of a photolithography tool adapted to process a subsequent wafer based on the determined column dimension.

17. The method of claim 16, wherein determining at least one parameter of the operating recipe of the photolithography tool comprises determining at least one of an exposure time parameter, an exposure dose parameter, a depth of focus parameter, a resist spin speed parameter, a soft bake temperature parameter, a post exposure bake temperature parameter, a cool plate temperature parameter, a developer temperature parameter, and a focus tilt parameter.

18. The method of claim 13, wherein generating the reflection profile comprises generating the reflection profile based on at least one of intensity and phase of the reflected light.

19. The method of claim 13, further comprising identifying a fault condition associated with the columns based on the determined column dimension.

20. The method of claim 13, wherein determining the dimension of the columns further comprises determining at least one of a diameter dimension, a height dimension, and a sidewall angle dimension.

21. The method of claim 13, wherein providing the wafer further comprises providing the wafer having the test structure comprising the plurality of trenches and the plurality of columns defined in the trenches, the columns in one trench being aligned with the columns in an adjacent trench.

22. The method of claim 13, wherein providing the wafer further comprises providing the wafer having the test structure comprising the plurality of trenches and the plurality of columns defined in the trenches, the columns in one trench being offset with respect to the columns in an adjacent trench.

23. A method for determining column dimensions, comprising:
    providing a wafer having a test structure comprising a plurality of trenches each having a width dimension, and a plurality of columns defined in the trenches, each column having a width dimension less than the width dimension of the trench in which it is defined;
    illuminating at least a portion of the columns with a light source;
    measuring light reflected from the illuminated portion of the columns to generate a reflection profile; and
    comparing the generated reflection profile to a target reflection profile; and
    determining a dimension of the columns based the comparison of the generated reflection profile and the target reflection profile.

24. The method of claim 23, further comprising determining at least one parameter of an operating recipe of a etch tool adapted to etch a subsequent wafer based on the determined column dimension.

25. The method of claim 24, wherein determining at least one parameter of the operating recipe of the etch tool comprises determining at least one of an etch time parameter, a plasma chemical composition parameter, an RF power parameter, a gas flow parameter, a chamber temperature parameter, a chamber pressure parameter, and an endpoint signal parameter.

26. The method of claim 23, further comprising determining at least one parameter of an operating recipe of a photolithography tool adapted to process a subsequent wafer based on the determined column dimension.

27. The method of claim 26, wherein determining at least one parameter of the operating recipe of the photolithography tool comprises determining at least one of an exposure time parameter, an exposure dose parameter, a depth of focus parameter, a resist spin speed parameter, a soft bake temperature parameter, a post exposure bake temperature parameter, a cool plate temperature parameter, a developer temperature parameter, and a focus tilt parameter.

28. The method of claim 23, wherein generating the reflection profile comprises generating the reflection profile based on at least one of intensity and phase of the reflected light.

29. The method of claim 23, further comprising identifying a fault condition associated with the columns based on the determined column dimension.

30. The method of claim 23, wherein determining the dimension of the columns further comprises determining at least one of a diameter dimension, a height dimension, and a sidewall angle dimension.

31. The method of claim 23, wherein providing the wafer further comprises providing the wafer having the test structure comprising the plurality of trenches and the plurality of columns defined in the trenches, the columns in one trench being aligned with the columns in an adjacent trench.

32. The method of claim 23, wherein providing the wafer further comprises providing the wafer having the test structure comprising the plurality of trenches and the plurality of columns defined in the trenches, the columns in one trench being offset with respect to the columns in an adjacent trench.

33. A metrology tool adapted to receive a wafer having a test structure comprising a plurality of trenches each having a width dimension, and a plurality of columns defined in the trenches, comprising:
  a light source adapted to illuminate at least a portion of the columns, each column having a width dimension less than the width dimension of the trench in which it is defined;
  a detector adapted to measure light reflected from the illuminated portion of the columns to generate a reflection profile; and
  a data processing unit adapted to determine a dimension of the columns based on the reflection profile.

34. The metrology tool of claim 33, wherein the data processing unit is further adapted to compare the generated reflection profile to a library of reference reflection profiles, each reference reflection profile having an associated column dimension metric, select a reference reflection profile closest to the generated reflection profile, and determine the dimension of the columns based on the column dimension metric associated with the selected reference reflection profile.

35. The metrology tool of claim 33, wherein the detector is further adapted to generate the reflection profile based on at least one of intensity and phase of the reflected light.

36. The metrology tool of claim 33, wherein the metrology tool comprises at least one of a scatterometer, an ellipsometer, and a reflectometer.

37. The metrology tool of claim 33, wherein the data processing unit is further adapted to compare the generated reflection profile to a target reflection profile and determine the dimension of the columns based on the comparison of the generated reflection profile and the target reflection profile.

38. The metrology tool of claim 33, wherein the columns in one trench are aligned with the columns in an adjacent trench.

39. The metrology tool of claim 33, wherein the columns in one trench are offset with respect to the columns in an adjacent trench.

40. A processing line, comprising:
  a processing tool adapted to process wafer in accordance with an operating recipe;
  a metrology tool adapted to receive a wafer having a test structure comprising a plurality of trenches each having a width dimension, and a plurality of columns defined in the trenches, each column having a width dimension less than the width dimension of the trench in which it is defined, the metrology tool comprising:
    a light source adapted to illuminate at least a portion of the columns;
    a detector adapted to measure light reflected from the illuminated portion of the columns to generate a reflection profile; and
    a data processing unit adapted determine a dimension of the columns based on the reflection profile; and
  a controller adapted to determine at least one parameter of the operating recipe of the processing tool based on the determined column dimension.

41. The processing line of claim 40, wherein the data processing unit is further adapted to compare the generated reflection profile to a library of reference reflection profiles, each reference reflection profile having an associated column dimension metric, select a reference reflection profile closest to the generated reflection profile, and determine the dimension of the columns based on the column dimension metric associated with the selected reference reflection profile.

42. The processing line of claim 40, wherein the detector is further adapted to generate the reflection profile based on at least one of intensity and phase of the reflected light.

43. The processing line of claim 40, wherein the metrology tool comprises at least one of a scatterometer, an ellipsometer, and a reflectometer.

44. The processing line of claim 40, wherein the data processing unit is further adapted to compare the generated reflection profile to a target reflection profile and determine the dimension of the columns based on the comparison of the generated reflection profile and the target reflection profile.

45. The processing line of claim 40, wherein the processing tool further comprises an etch tool, and the controller is further adapted to determine at least one of an etch time parameter, a plasma chemical composition parameter, an RF power parameter, a gas flow parameter, a chamber temperature parameter, a chamber pressure parameter, and an endpoint signal parameter.

46. The processing line of claim 40, wherein the processing tool further comprises a photolithography tool, and the controller is further adapted to determine at least one of an exposure time parameter, an exposure dose parameter, a depth of focus parameter, a resist spin speed parameter, a soft bake temperature parameter, a post exposure bake temperature parameter, a cool plate temperature parameter, a developer temperature parameter, and a focus tilt parameter.

47. The processing line of claim 40, wherein the columns in one trench are aligned with the columns in an adjacent trench.

48. The processing line of claim 40, wherein the columns in one trench are offset with respect to the columns in an adjacent trench.

49. The processing line of claim 40, wherein the controller is further adapted to identify a fault condition associated with the columns based on the determined column dimension.

50. A metrology tool adapted to receive a wafer having a test structure comprising a plurality of trenches each having a width dimension, and a plurality of columns defined in the trenches, comprising:
- a light source adapted to illuminate at least a portion of the columns, each column having a width dimension less than the width dimension of the trench in which it is defined;
- a detector adapted to measure light reflected from the illuminated portion of the columns to generate a reflection profile; and
- a data processing unit adapted to compare the generated reflection profile to a library of reference reflection profiles, each reference reflection profile having an associated column dimension metric, select a reference reflection profile closest to the generated reflection profile, and determine a dimension of the columns based on the column dimension metric associated with the selected reference reflection profile.

51. A metrology tool adapted to receive a wafer having a test structure comprising a plurality of trenches each having a width dimension and a plurality of columns defined in the trenches, comprising:
- a light source adapted to illuminate at least a portion of the columns, each column having a width dimension less than the width dimension of the trench in which it is defined;
- a detector adapted to measure light reflected from the illuminated portion of the columns to generate a reflection profile; and
- a data processing unit adapted to compare the generated reflection profile to a target reflection profile and determine a dimension of the columns based on the comparison of the generated reflection profile and the target refection profile.

52. A test structure, comprising:
- a plurality of trenches each having a width dimension; and
- a plurality of columns defined in the trenches each having a width dimension less than the width dimension of the trench in which is defined.

53. The test structure of claim 52, further comprising a base layer, the trenches being defined in the base layer.

54. The test structure of claim 52, wherein the columns in one trench are aligned with the columns in an adjacent trench.

55. The test structure of claim 52, wherein the columns in one trench are offset with respect to the columns in an adjacent trench.

56. The test structure of claim 53, wherein the base layer comprises at least one of a photoresist layer, a substrate layer, an insulative layer, and a conductive layer.

57. A metrology tool, comprising:
- means for receiving a wafer having a test structure comprising a plurality of trenches each having a width dimension, and a plurality of columns defined in the trenches, each column having a width dimension less than the width dimension of the trench in which it is defined;
- means for illuminating at least a portion of the columns with a light source;
- means for measuring light reflected from the illuminated portion of the columns to generate a reflection profile; and
- means for determining a dimension of the columns based on the reflection profile.

58. The metrology tool of claim 57, further comprising:
- means for comparing the generated reflection profile to a library of reference reflection profiles, each reference reflection profile having an associated column dimension metric;
- means for selecting a reference reflection profile closest to the generated reflection profile; and
- means for determining the dimension of the columns based on the column dimension metric associated with the selected reference reflection profile.

59. The metrology tool of claim 57, further comprising:
- means for comparing the generated reflection profile to a target reflection profile; and
- means for determining the dimension of the columns based on the comparison of the generated reflection profile and the target reflection profile.

* * * * *